(12) United States Patent
Shih et al.

(10) Patent No.: US 7,375,706 B2
(45) Date of Patent: May 20, 2008

(54) PIXEL STRUCTURE OF A LIQUID CRYSTAL DISPLAY AND DRIVING METHOD THEREOF

(75) Inventors: Po-Sheng Shih, Taoyuan Hsien (TW); Hsuan-Lin Pan, Taoyuan Hsien (TW)

(73) Assignee: Hannstar Display Corporation, Taipei (TW)

( * ) Notice: Subject to any disclaimer, the term of this patent is extended or adjusted under 35 U.S.C. 154(b) by 786 days.

(21) Appl. No.: 10/962,730

(22) Filed: Oct. 12, 2004

(65) Prior Publication Data

US 2005/0195139 A1 Sep. 8, 2005

Related U.S. Application Data

(63) Continuation-in-part of application No. 10/790,824, filed on Mar. 3, 2004, now Pat. No. 7,271,789.

(30) Foreign Application Priority Data

Jul. 2, 2004 (TW) ............................... 93120035 A (51) Int. Cl.
G09G 3/36 (2006.01)

(52) U.S. Cl. ............................ 345/87; 345/92; 345/98

(58) Field of Classification Search .......... 345/87–100, 345/204
See application file for complete search history.

(56) References Cited

U.S. PATENT DOCUMENTS

| | | | |
|---|---|---|---|
| 6,982,690 B2* | 1/2006 | Lee et al. | 345/87 |
| 6,989,826 B2* | 1/2006 | Kasai | 345/204 |
| 2001/0026257 A1* | 10/2001 | Kimura | 345/87 |
| 2003/0169223 A1* | 9/2003 | Lee et al. | 345/92 |
| 2004/0108987 A1* | 6/2004 | Park et al. | 345/92 |
| 2004/0135752 A1* | 7/2004 | Park | 345/87 |
| 2007/0296662 A1* | 12/2007 | Lee et al. | 345/87 |

* cited by examiner

Primary Examiner—Richard Hjerpe
Assistant Examiner—Kimnhung Nguyen
(74) Attorney, Agent, or Firm—Thomas, Kayden, Horstemeyer & Risley (57) ABSTRACT

A pixel region is surrounded in any adjacent scan lines and any adjacent data lines. Two thin film transistor (TFT) groups that are controlled by different scan lines are located in each pixel region. The two data lines respectively send different polarity data to the pixel region through the two TFT groups. At least one capacitor is used to couple with the two TFT groups for providing a coupling effect to make sure the voltage in the two connection points simultaneously goes up and down.

17 Claims, 7 Drawing Sheets

FIG. 5 a comparison diagram of the $\Delta V_{CE}$
between figure 3 and figure 5 pixel region in figure 3

|  | $\Delta V_{CE}$ |
|---|---|
| positive polarity | 1.72 |
| negative polarity | 1.41 | pixel region in figure 5

|  | $\Delta V_{CE}$ |
|---|---|
| positive polarity | 1.08 |
| negative polarity | 0.81 |

FIG. 6A a comparison diagram of the $\Delta V_{pixel}$
between figure 3 and figure 5 pixel region in figure 3

|  | $\Delta V_{pixel}$ |
|---|---|
| positive polarity | 0.821 |
| negative polarity | 0.757 | pixel region in figure 5

|  | $\Delta V_{pixel}$ |
|---|---|
| positive polarity | 0.5912 |
| negative polarity | 0.5273 |

FIG. 6B

FIG. 7 a comparison diagram of the $\Delta V_{CE}$
between figure 5 and figure 7 pixel region in figure 5

|  | $\Delta V_{CE}$ |
|---|---|
| positive polarity | 1.08 |
| negative polarity | 0.81 | pixel region in figure 7

|  | $\Delta V_{CE}$ |
|---|---|
| positive polarity | 0.68 |
| negative polarity | 0.99 |

FIG. 8A a comparison diagram of the $\Delta V_{pixel}$
between figure 5 and figure 7 pixel region in figure 5

|  | $\Delta V_{pixel}$ |
|---|---|
| positive polarity | 0.5912 |
| negative polarity | 0.5273 | pixel region in figure 7

|  | $\Delta V_{pixel}$ |
|---|---|
| positive polarity | 0.42 |
| negative polarity | 0.595 |

FIG. 8B

PIXEL STRUCTURE OF A LIQUID CRYSTAL DISPLAY AND DRIVING METHOD THEREOF

CROSS-REFERENCE TO RELATED APPLICATIONS

This application is a continuation-in-part of U.S. application Ser. No. 10/790,824, filed on Mar. 3, 2004 now U.S. Pat. No. 7,271,789, hereby incorporated by reference as it fully set forth herein. The present application also claims priority from, Taiwan Application Serial Number 93120035, filed Jul. 2, 2004, the disclosure of which is hereby incorporated by reference herein in its entirety.

FIELD OF THE INVENTION

The present invention relates to a driving circuit, and more particularly, to a driving circuit of a liquid crystal display.

BACKGROUND OF THE INVENTION

User demand for entertainment equipment is particularly high as a result of the rapid development of multimedia applications. Conventionally, the cathode ray tube (CRT) display, which is a type of monitor, is commonly used. However, the cathode ray tube display does not meet the needs of multimedia technology because of the large volume thereof. Therefore, many flat panel display techniques such as liquid crystal display (LCD) have been recently developed.

Conventional LCD panels have narrow view angles so the normal images displayed by them only can be viewed directly in front of the display area. If the display area is watched from an oblique view angle, color distortion occurs in what is viewed, and gray inversion may even occur. That is, what appears black is actually white and what appears white is actually black. Therefore, how to widen the view angle is an important subject for the LCD manufacturers.

Among various methods for widening the view angle, an LC vertical alignment (VA) technique is still one of the most popular techniques in the current LCD market. However, because liquid crystal molecules are aligned in the same direction (mono-domain vertical alignment), a normal image cannot be seen from a view angle perpendicular to or symmetric to the direction. No matter whether the liquid crystal molecules are realigned in a different direction after the electrical field existing therein changes, the view angle is also limited to the parallel direction of the liquid crystal molecules. Therefore, a multi-domain VA (MVA) technique has been put forth to improve the drawback of the prior art. However, according to MVA technology, additional ridges or bumps are required on the color filter to control the alignment of the tilt direction of liquid crystal molecules and automatically align tilt direction according to their region to which they belong. But because the existence of the bumps results in a need for precise alignment between a color filter and an active matrix substrate, and an additional overcoating must be formed on the color filter, the yield of this LCD panel is reduced and the cost thereof is increased. Therefore, bias-bending vertical alignment (BBVA) technology has been developed to solve the foregoing problem.

Figure 1:
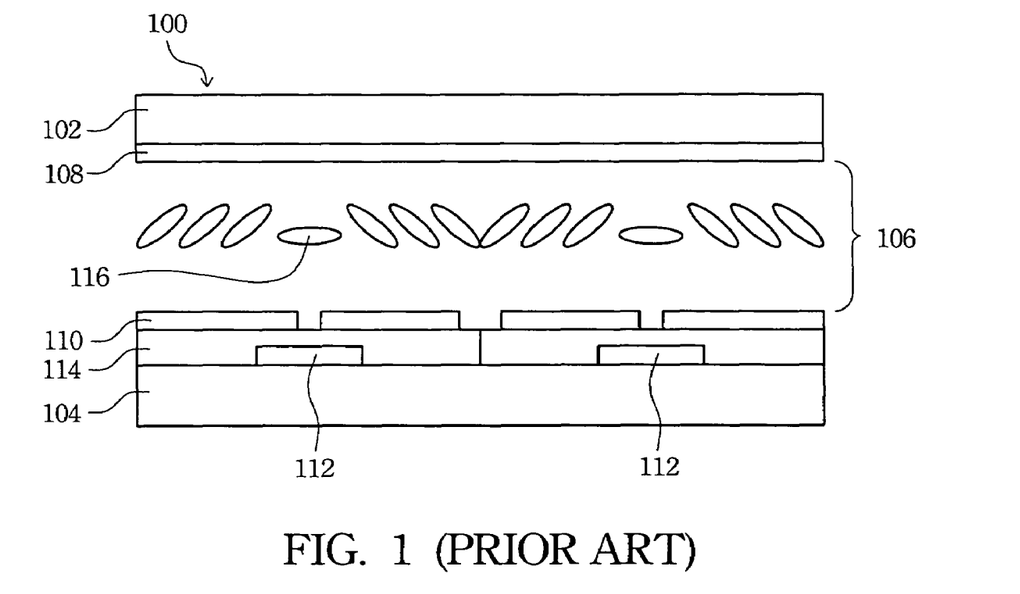
FIG. 1 is a schematic, cross-sectional diagram of a conventional liquid crystal display implementing bias-bending vertical alignment (BBVA)

FIG. 1 is a schematic, cross-sectional diagram of a conventional LCD display panel of the bias-bending vertical alignment (BBVA) type. The LCD panel 100 comprises an upper transparent substrate 102, a lower transparent substrate 104 and a liquid crystal molecule layer 106 between the upper and lower substrates 102 and 104. A common electrode 108 is located over the upper transparent substrate 102. Pixel electrodes 110 are located over the lower transparent substrate 104. A main electric field exists between the common electrode 108 and the pixel electrode 110 to make liquid crystal molecules 116 have oblique positions. A control electrode 112 is formed on the lower substrate 104. An insulation layer 114 is interposed between the control electrode 112 and the pixel electrode 110. During operation, a bias voltage is generated first between the control electrode 112 and the common electrode 108. The bias voltage causes the corresponding liquid crystal molecule to be in a saturation state. Then, when another voltage is applied to the pixel electrode 110, the adjacent liquid crystal molecules are sequentially arranged in a predetermined orientation.

Figure 2:
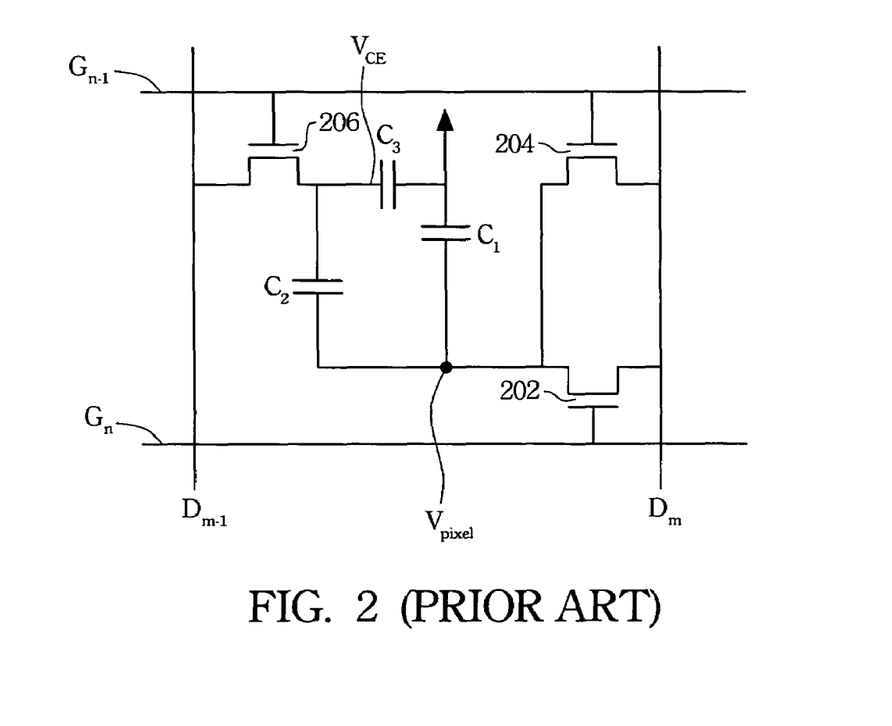
FIG. 2 illustrates an equivalent circuit diagram of a pixel of a conventional liquid crystal display implementing bias-bending vertical alignment (BBVA)

FIG. 2 is a conventional equivalent circuit diagram of a pixel region implanting BBVA technology. Three thin film transistors are located in each pixel region. The thin film transistors 202 and 204 serve as switches of the pixel electrode voltage ($V_{pixel}$). The thin film transistor 206 serve as a switch of the control electrode voltage ($V_{CE}$). The three thin film transistors 202, 204 and 206 are controlled by the signals from the adjacent scan lines $G_{n-1}$ and $G_n$.

When the scan line $G_{n-1}$ is scanned, the thin film transistors 204 and 206 are on and the thin film transistor 202 is off. At this time, the control electrode voltage ($V_{CE}$) and the pixel voltage ($V_{pixel}$) are written into the data lines $D_{m-1}$ and $D_m$ through the thin film transistors 204 and 206, respectively. Therefore, a voltage difference is built between the control electrode voltage ($V_{CE}$) and the pixel voltage ($V_{pixel}$). Next, when the scan line $G_n$ is scanned, the thin film transistor 202 is on and the thin film transistors 204 and 206 are off. At this time, the voltage signal transmitted in the data line $D_m$ is written into the pixel region through the thin film transistor 202. The control electrode voltage ($V_{CE}$) is raised or dropped to a specific voltage by the pixel voltage ($V_{pixel}$) through a coupling effect generated by a capacitor $C_2$.

However, three thin film transistors are used in the conventional circuit structure designed for BBVA technology, which reduces the aperture ratio. If one of the thin film transistors is damaged, the pixel is considered to be malfunctioning. On the other hand, too many thin film transistors connected to a same scanning line result in a severe RC delay on the scan signal.

SUMMARY OF THE INVENTION

The main purpose of the present invention is to provide a pixel structure of a liquid crystal display implementing the BBVA driving type. According to this structure, the number of the required thin film transistors in a pixel region can be reduced. Therefore, the aperture ratio of the pixel region can be raised and the RC delay phenomenon can be reduced.

Another purpose of the present invention is to provide a pixel structure of a liquid crystal display implementing the BBVA driving type. According to this structure, it is not necessary to redesign the driving circuit. Therefore, the convenience in use can be improved.

Yet another purpose of the present invention is to provide a pixel structure of a liquid crystal display in which additional ridges or bumps are not required to change the orientation of the liquid crystal molecules. Therefore, the manufacturing cost can be reduced. The range of the permitted error in the alignment process can be raised to improve the manufacturing yield.

According to the above purposes of the present invention, a pixel region is surrounded in any adjacent scan lines and any adjacent data lines. Two thin film transistor (TFT) groups controlled by different scan lines are located in each pixel region. The two data lines respectively send different polarity data to the pixel region through the two TFT groups. At least one capacitor is used to couple with the two TFT groups for providing a coupling effect to make sure the voltage in the two connection points simultaneously goes up and down.

The present invention also provides an operating waveform of this pixel structure. According to the operating waveform, the adjacent scan lines can be maintained at a "high" level together at a specific time to conduct the two thin film transistor groups connected to the adjacent scan lines. At this time, different polarity date signals transmitted in the data lines are written into the control electrode voltage and the pixel electrode voltage through the two thin film transistor groups. Therefore, a voltage difference exists between the control electrode voltage and the pixel electrode voltage.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 3:
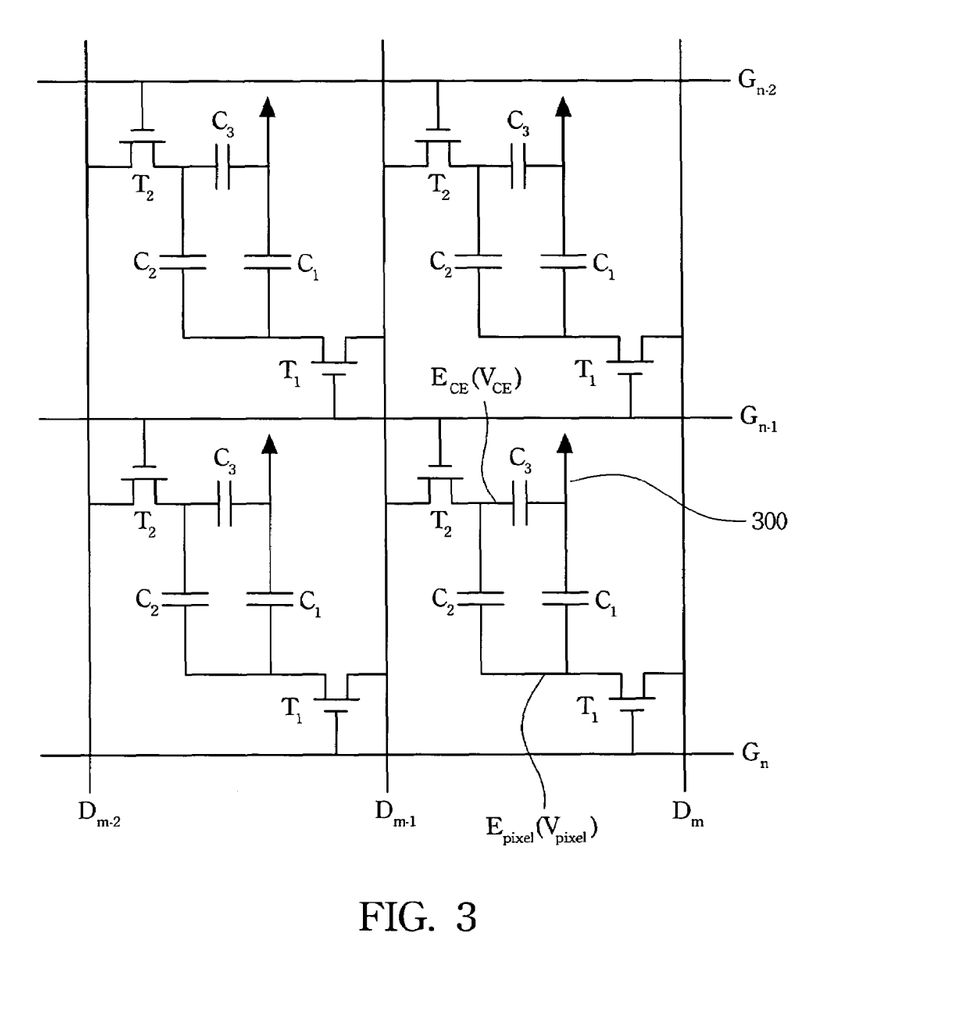
FIG. 3 illustrates an equivalent circuit diagram for driving a liquid crystal display implementing bias-bending vertical alignment (BBVA) according to the first embodiment of the present invention.

FIG. 3 illustrates an equivalent circuit diagram for driving a liquid crystal display implementing bias-bending vertical alignment (BBVA) according to the first embodiment of the present invention. Only four adjacent pixels are shown in FIG. 3, which are formed by scan lines $G_{n-2}$, $G_{n-1}$ and $G_n$ arranged in parallel to each other and crossing data lines $D_{m-2}$, $D_{m-1}$ and $D_m$ arranged in parallel to each other. Each pixel region includes a first thin film transistor $T_1$, a second thin film transistor $T_2$, a control electrode $E_{CE}$ with control electrode voltage $V_{CE}$ and a pixel electrode $E_{pixel}$ with pixel electrode voltage $V_{pixel}$.

In this pixel region surrounded by the adjacent scan lines $G_{n-1}$ and $G_n$ and the adjacent data lines $D_{m-1}$ and $D_m$, the gate electrode of the first thin film transistor $T_1$ is connected to the scan line $G_n$. The source electrode and the drain electrode of the first thin film transistor $T_1$ are respectively connected to the data line $D_m$ and the pixel electrode $E_{pixel}$. The gate electrode of the second thin film transistor $T_2$ is connected to the scan line $G_{n-1}$. The source electrode and the drain electrode of the second thin film transistor $T_2$ are respectively connected to the data line $D_{m-1}$ and the control electrode $E_{CE}$. In the pixel configuration of the presented invention, a liquid crystal capacitor $C_1$ exists between the pixel electrode $E_{pixel}$ and a common electrode 300, a capacitor $C_2$ exists between the control electrode $E_{CE}$ and the pixel electrode $E_{pixel}$ and a bias voltage capacitor $C_3$ is formed between the control electrode $E_{CE}$ and the common electrode 300.

Figure 4:
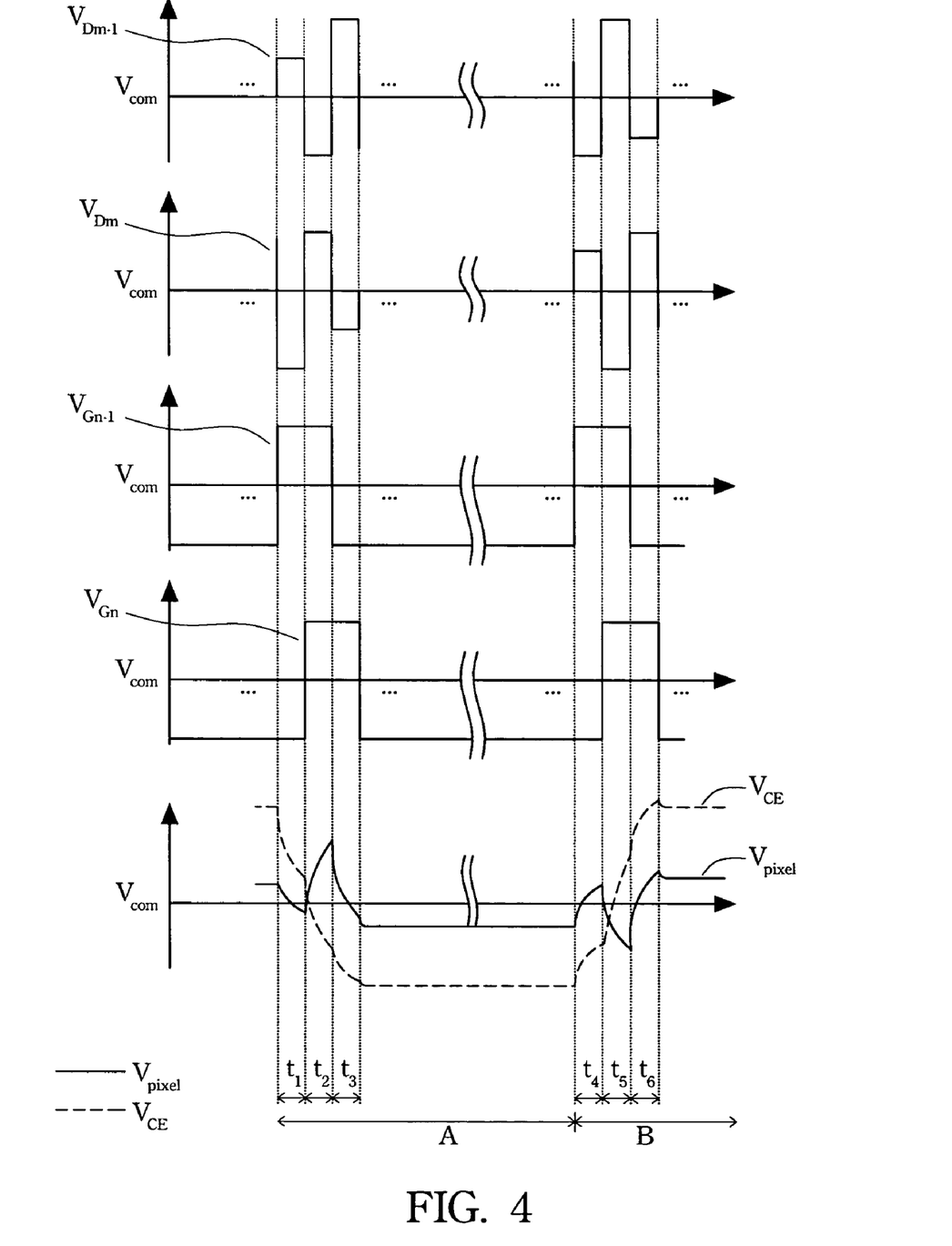
FIG. 4 is a waveform diagram of driving signals applied to the pixel in FIG. 3.

FIG. 4 is a waveform diagram of driving signals applied to the pixel in FIG. 3. A dot-inversion driving method is applied to the driving circuit. Accordingly, the polarity states of the adjacent data lines are inversed as shown in FIG. 4. The voltage signal $V_{Dm-1}$ and the voltage signal $V_{Dm}$ with the reversed polarity states are respectively applied to the data lines $D_{m-1}$ and $D_m$. The voltage signal $V_{Gn-1}$ and the voltage signal $V_{Gn}$ are applied to the scan lines $G_n$ and $G_{n-1}$. The driving method of the present invention is to extend the turning on time of the thin film transistors located in the adjacent pixel regions. In other words, the driving signals transmitted by the adjacent scan lines are in the "high" state together during a specific time period. Therefore, the first thin film transistor $T_1$ and the second thin film transistor $T_2$ are "on" together during the specific time period.

The operation method is described in the following when the waveform depicted in FIG. 4 is applied to the pixel region surrounded by the adjacent scan lines $G_{n-1}$ and $G_n$ and the adjacent data lines $D_{m-1}$ and $D_m$. The voltage signal $V_{Dm-1}$ and the voltage signal $V_{Dm}$ with the reversed polarity states are respectively applied to the data lines $D_{m-1}$ and $D_m$. The common electrode voltage is represented by the $V_{com}$.

Reference is made to FIG. 3 and FIG. 4 together. In the negative time frame period A, at time $t_1$, the voltage signal $V_{Gn-1}$ of the scan line $G_{n-1}$ is in a "high" state so as to turn on the thin film transistor $T_2$. The voltage signal $V_{Gn}$ of the scan line $G_n$ is in a "low" state so as to turn off the thin film transistor $T_1$. At this time, the positive polarity voltage signal $V_{Dm-1}$ transmitted by the data line $D_{m-1}$ is written into the control electrode $E_{CE}$ through the thin film transistor $T_2$.

At time $t_2$, the driving signals $V_{Gn-1}$ and $V_{Gn}$ respectively transmitted by the adjacent scan lines $G_{n-1}$ and $G_{Gn}$ both are in "high" states so as to turn on the thin film transistor $T_1$ and the thin film transistor $T_2$. At this time, the negative polarity voltage signal $V_{Dm-1}$ transmitted by the data line $D_{m-1}$ is written into the control electrode $E_{CE}$ through the thin film transistor $T_2$. The positive polarity voltage signal $V_{Dm}$ transmitted by the data line $D_m$ is written into the pixel electrode $E_{pixel}$ through the thin film transistor $T_1$. Since the written polarity states are inversed, a significant voltage difference exists between the pixel electrode $E_{pixel}$ and the control electrode $E_{CE}$. The significant voltage difference is provided to the liquid crystal molecule layer to change their orientations.

At time $t_3$, the voltage signal $V_{Gn-1}$ of the scan line $G_{n-1}$ is in a "low" state so as to turn off the thin film transistor $T_2$. The voltage signal $V_{Gn}$ of the scan line $G_n$ is in a "high" state so that the thin film transistor $T_1$ remains on. At this time, the negative polarity voltage signal $V_{Dm}$ transmitted by the data line $D_m$ is written into the pixel electrode $E_{pixel}$ through the thin film transistor $T_1$. Since the thin film transistor $T_2$ is off state, the control electrode $E_{CE}$ is in a "floating" state. Therefore, the voltage of the control electrode $E_{CE}$ is further dropped down by the coupling effect of the capacitor $C_2$ between the control electrode $E_{CE}$ and the pixel electrode $E_{pixel}$.

According to the operating method in the negative time frame, the value of the voltage difference between the control electrode $E_{CE}$ and the pixel electrode $E_{pixel}$ is determined at the moment time $t_2$ ends. At this moment, the voltage polarity of the pixel electrode $E_{pixel}$ is positive and the voltage polarity of the control electrode $E_{CE}$ is negative, which is exactly inversed. On the other hand, when time $t_2$ ends, the voltage difference between the control electrode $E_{CE}$ and the pixel electrode $E_{pixel}$ is further dropped down because of the coupling effect of the capacitor $C_2$, which provides a larger bias voltage to the liquid crystal molecule to change their orientations.

Similarly, in the positive time frame period B, at time $t_4$, the voltage signal $V_{Gn-1}$ of the scan line $G_{n-1}$ is in a "high" state so as to turn on the thin film transistor $T_2$. The voltage signal $V_{Gn}$ of the scan line $G_n$ is in a "low" state so as to turn off the thin film transistor $T_1$. At this time, the negative polarity voltage signal $V_{Dm-1}$ transmitted by the data line $D_{m-1}$ is written into the control electrode $E_{CE}$ through the thin film transistor $T_2$.

At time $t_5$, the driving signals $V_{Gn-1}$ and $V_{Gn}$ respectively transmitted by the adjacent scan lines $G_{n-1}$ and $G_{Gn}$ both are in "high" states so as to turn on the thin film transistor $T_1$ and the thin film transistor $T_2$. At this time, the positive polarity voltage signal $V_{Dm-1}$ transmitted by the data line $D_{m-1}$ is written into the control electrode $E_{CE}$ through the thin film transistor $T_2$. The negative polarity voltage signal $V_{Dm}$ transmitted by the data line $D_m$ is written into the pixel electrode $E_{pixel}$ through the thin film transistor $T_1$. Since the written polarity states are inversed, a significant voltage difference exists between the pixel electrode $E_{pixel}$ and the control electrode $E_{CE}$. The significant voltage difference is provided to the liquid crystal molecule layer to change their orientations.

At time $t_6$, the voltage signal $V_{Gn-1}$ of the scan line $G_{n-1}$ is in a "low" state so as to turn off the thin film transistor $T_2$. The voltage signal $V_{Gn}$ of the scan line $G_n$ is in a "high" state so that the thin film transistor $T_1$ remains on. At this time, the positive polarity voltage signal $V_{Dm}$ transmitted by the data line $D_m$ is written into the pixel electrode $E_{pixel}$ through the thin film transistor $T_1$. Since the thin film transistor $T_2$ is off, the control electrode $E_{CE}$ is in a "floating" state. Therefore, the voltage of the control electrode $E_{CE}$ is further raised up by the coupling effect of the capacitor $C_2$ between the control electrode $E_{CE}$ and the pixel electrode $E_{pixel}$.

According to the operating method in the positive time frame, the value of the voltage difference between the control electrode $E_{CE}$ and the pixel electrode $E_{pixel}$ is determined in the moment while time $t_5$ is over. At this moment, the voltage polarity of the pixel electrode $E_{pixel}$ is negative and the voltage polarity of the control electrode $E_{CE}$ is positive, which is exactly inversed. On the other hand, when time $t_5$ ends, the voltage difference between the control electrode $E_{CE}$ and the pixel electrode $E_{pixel}$ is further raised up because of the coupling effect of the capacitor $C_2$, which can provide a larger bias voltage to the liquid crystal molecule to change their orientations.

In other words, according to the operating method used in the positive time frame of the present invention, the voltage relationship between the control electrode $E_{CE}$ and the pixel electrode $E_{pixel}$ is that the pixel electrode voltage $V_{pixel}$ is larger than common electrode voltage $V_{com}$ and the control electrode voltage $V_{CE}$ is larger than the pixel electrode voltage $V_{pixel}$. Therefore, the following is the relationship between the three voltages, $V_{pixel}$, $V_{com}$ and $V_{CE}$:

$$V_{CE} > V_{pixel} > V_{com}$$

According to the operating method used in the negative time frame of the present invention, the pixel electrode voltage $V_{pixel}$ is less than common electrode voltage $V_{com}$ and the control electrode voltage $V_{CE}$ is less than the pixel electrode voltage $V_{pixel}$. Therefore, the following is the relationship between the three voltages, $V_{pixel}$, $V_{com}$ and $V_{CE}$:

$$V_{com} > V_{pixel} > V_{CE}$$

When the thin film transistor $T_2$ is off, the control electrode $E_{CE}$ is in a "floating" state. At this time, the voltage of the control electrode $E_{CE}$ is further raised up or pulled down by the coupling effect of the capacitor $C_2$ between the control electrode $E_{CE}$ and the pixel electrode $E_{pixel}$. Such situation could result in too great a voltage difference being applied to the source electrode and the drain electrode when the thin film transistor $T_2$ is off. This too-great voltage difference would then cause a leakage current in the thin film transistor $T_2$ to pull down the voltage of the control electrode $E_{CE}$ that is in a "floating" state. Before this pixel region is scanned by the scan signal again, when the thin film transistor $T_1$ and the thin film transistor $T_2$ are both off, at this time, both the control electrode $E_{CE}$ and the pixel electrode $E_{pixel}$ are in "floating" states. Therefore, the voltage decrease of the control electrode $E_{CE}$ pulls down the voltage of the pixel electrode $E_{pixel}$ because of the coupling effect of the capacitor $C_2$ between the control electrode $E_{CE}$ and the pixel electrode $E_{pixel}$, which causes a flicker phenomenon in the display.

Figure 5:
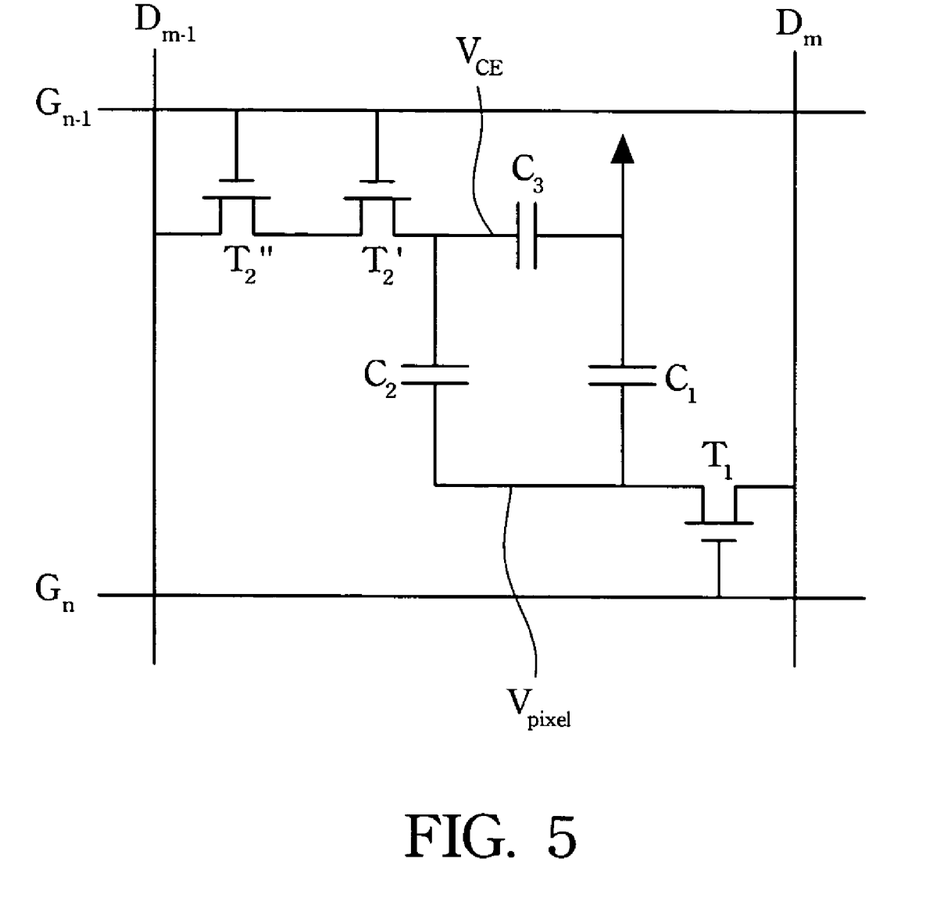
FIG. 5 illustrates an equivalent circuit diagram for driving a liquid crystal display implementing a bias-bending vertical alignment (BBVA) type according to the second embodiment of the present invention.

FIG. 5 illustrates an equivalent circuit diagram for driving a liquid crystal display implementing a bias-bending vertical alignment (BBVA) type according to the second embodiment of the present invention. For avoiding a leakage current generated in the thin film transistor $T_2$ because of too great voltage difference being applied to the source and drain electrode, two thin film transistors $T_2'$ and $T_2''$ arranged in series are used in the second embodiment to replace the thin film transistor $T_2$ in the first embodiment. According to the structure of the second embodiment, the voltage originally applied to the source and drain electrode of the thin film transistor $T_2$ can be spread to the two thin film transistors $T_2'$ and $T_2''$ arranged in series. Therefore, the cross voltage in the source and drain electrode of each thin film transistor is reduced so as to reduce the leakage current. The smaller leakage current smoothes the voltage change of the control electrode $E_{CE}$ that is in "floating" state. Of course, the voltage change of the pixel electrode $E_{pixel}$ because of the coupling effect generated by the capacitor $C_2$ also can be smoothed. Therefore, the flicker phenomenon can be reduced. It is noted that the first embodiment and the second embodiment have the same operating method and the operating waveform diagram.

Figure 6A:
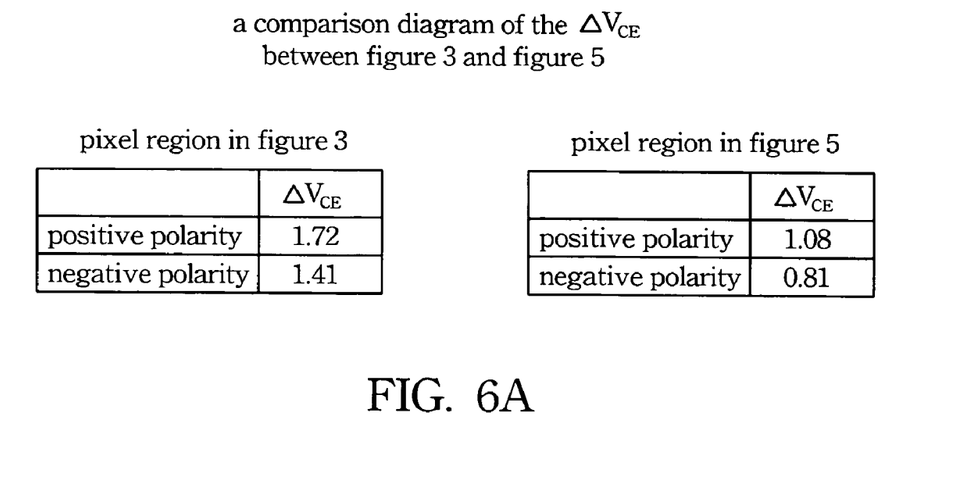
FIG. 6A illustrates a comparison diagram of the control electrode voltage variation ($\Delta V_{CE}$) in the pixel regions depicted in FIG. 3 and FIG. 5 when the scan signals do not select the pixel regions.

FIG. 6A illustrates a comparison diagram of the control electrode voltage variation ($\Delta V_{CE}$) in the pixel regions depicted in FIG. 3 and FIG. 5 when the scan signals do not select the pixel regions. According to this diagram, when the control electrode voltage $V_{CE}$ is applied to the source and drain electrode of the thin film transistor T2 illustrated in FIG. 3, the voltage variation ($\Delta V_{CE}$) of the control electrode ($E_{CE}$) is 1.72 volts during the positive polarity period of the dot inversion driving method. The voltage variation ($\Delta V_{CE}$) of the control electrode ($E_{CE}$) is 1.41 volts during the negative polarity period of the dot inversion driving method. On the other hand, when the control electrode voltage $V_{CE}$ is applied to the source and drain electrode of the in-series thin film transistors $T_2'$ and $T_2''$ illustrated in FIG. 5, the voltage variation ($\Delta V_{CE}$) of the control electrode ($E_{CE}$) is 1.08 volts during the positive polarity period of the dot inversion driving method. On the other hand, the voltage variation ($\Delta V_{CE}$) of the control electrode ($E_{CE}$) is 0.81 volts during the negative polarity period of the dot inversion driving method.

Figure 6B:
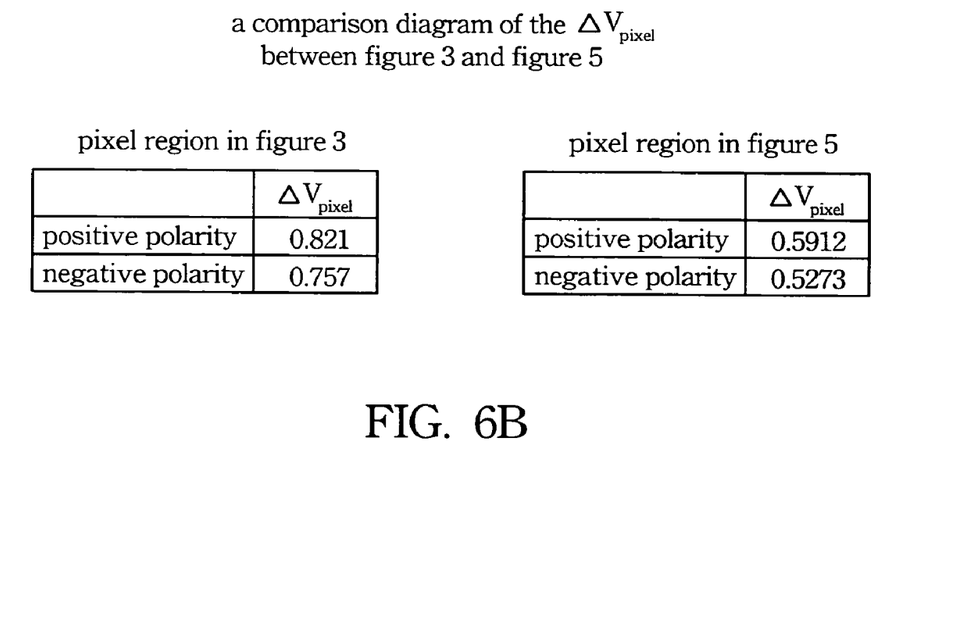
FIG. 6B illustrates a comparison diagram of the pixel electrode voltage variation ($\Delta V_{pixel}$) in the pixel regions depicted in FIG. 3 and FIG. 5 when the scan signals do not select the pixel regions.

FIG. 6B illustrates a comparison diagram of the pixel electrode voltage variation ($\Delta V_{pixel}$) in the pixel regions depicted in FIG. 3 and FIG. 5 when the scan signals do not select the pixel regions. According to this diagram, when the control electrode voltage $V_{CE}$ is applied to the source and drain electrode of the thin film transistor T2 illustrated in FIG. 3, the pixel electrode voltage variation ($\Delta V_{pixel}$) resulting from the control electrode voltage variation ($\Delta E_{pixel}$) is 0.821 volts during the positive polarity period of the dot inversion driving method. The pixel electrode voltage variation ($\Delta V_{pixel}$) resulting from the control electrode voltage variation ($\Delta_{pixel}$) is 0.757 volts during the negative polarity period of the dot inversion driving method. On the other hand, when the control electrode voltage $V_{CE}$ is applied to the source and drain electrode of the in-series thin film transistors $T_2'$ and $T_2''$ illustrated in FIG. 5, the pixel electrode voltage variation ($\Delta V_{pixel}$) resulting from the control electrode voltage variation ($\Delta V_{CE}$) is 0.5912 volts during the positive polarity period of the dot inversion driving method. On the other hand, the pixel electrode voltage variation ($\Delta V_{pixel}$) resulting from the control electrode voltage variation ($\Delta V_{CE}$) is 0.5273 volts during the negative polarity period of the dot inversion driving method.

According to the comparison diagrams illustrated in FIG. 6A and FIG. 6B, the leakage current in a pixel region is obviously improved by using in-series thin film transistors $T_2'$ and $T_2''$ to replace the thin film transistor $T_2$ to reduce the cross voltage connected to the source and drain electrode. Therefore, the voltage variations $\Delta E_{pixel}$ and $\Delta V_{pixel}$ is improved so as to reduce the flicker phenomenon.

Figure 7:
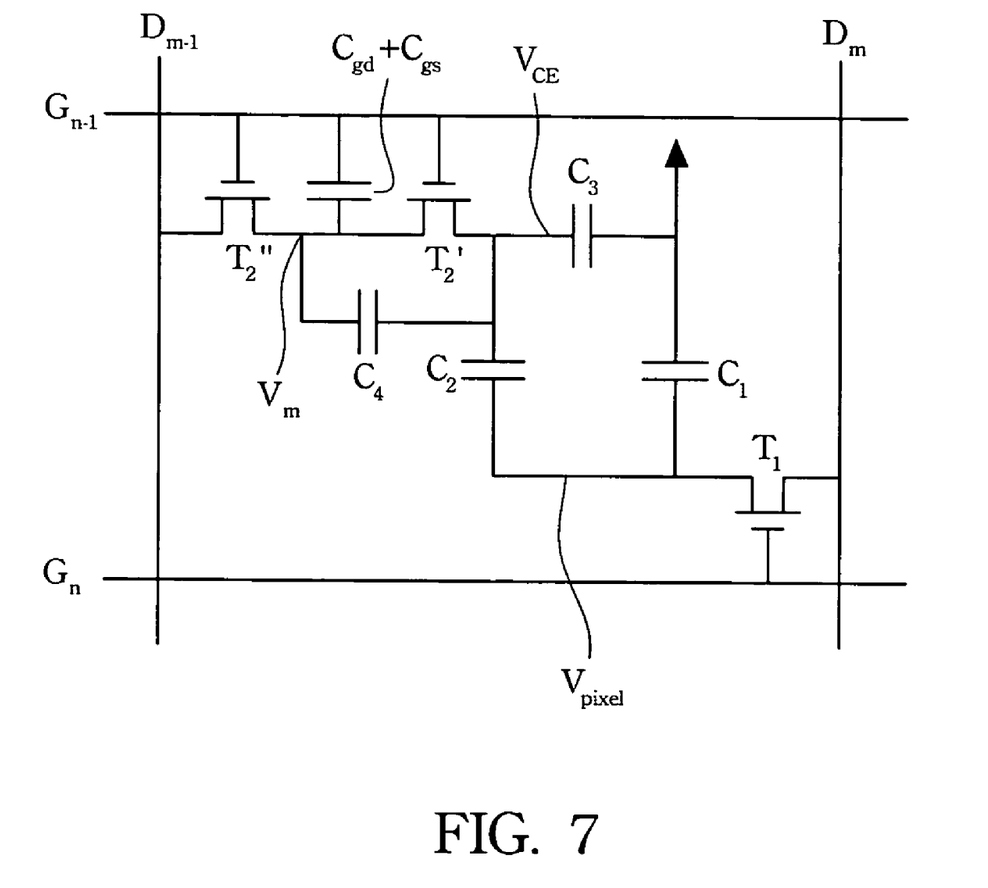
FIG. 7 illustrates an equivalent circuit diagram for driving a liquid crystal display implementing bias-bending vertical alignment (BBVA) according to the third embodiment of the present invention.

FIG. 7 illustrates an equivalent circuit diagram for driving a liquid crystal display implementing a bias-bending vertical alignment (BBVA) type according to the third embodiment of the present invention. Typically, a parasitic capacitor $C_{gd}$ exists between the gate electrode and the drain electrode in a thin film transistor. A parasitic capacitor $C_{gs}$ exists between the gate electrode and the source electrode in a thin film transistor. Therefore, when using in-series thin film transistors $T_2'$ and $T_2''$ with a common connection $V_m$ (illustrated in FIG. 5) to replace the thin film transistor $T_2$ (illustrated in FIG. 3), parasitic capacitors $C_{gs}$ and $C_{gd}$ exist between the gate electrode, the drain electrode, the source electrode and the common connection $V_m$.

When the scan signal applied to the scan line $G_{n-1}$ is switched from a "high" level to a "low" level, the voltage in the common connection $V_m$ is pull down again due to the parasitic capacitors $C_{gs}$ and $C_{gd}$. At this time, the voltage difference of the drain electrode and the source electrode of the thin film transistor $T_2'$ is enlarged to generate a leakage current. Therefore, for further reducing the leakage current phenomenon, an additional capacitor $C_4$ is cross-connected to the source electrode and the drain electrode of the thin film transistor $T_2'$ in the third embodiment. It is noted that the first embodiment and the third embodiment have the same operating method and the operating waveform diagram.

By using the capacitor $C_4$, when the scan signal applied to the scan line $G_{n-1}$ is switched from a "high" level to a "low" level, the control electrode voltage $V_{CE}$ restrains the voltage in the common connection $V_m$ to be pulled down again due to the coupling effect of the capacitor $C_4$. Therefore, the voltage difference of the drain electrode and the source electrode of the thin film transistor $T_2'$ is not enlarged so that the leakage current phenomenon can be reduced.

Figure 8A:
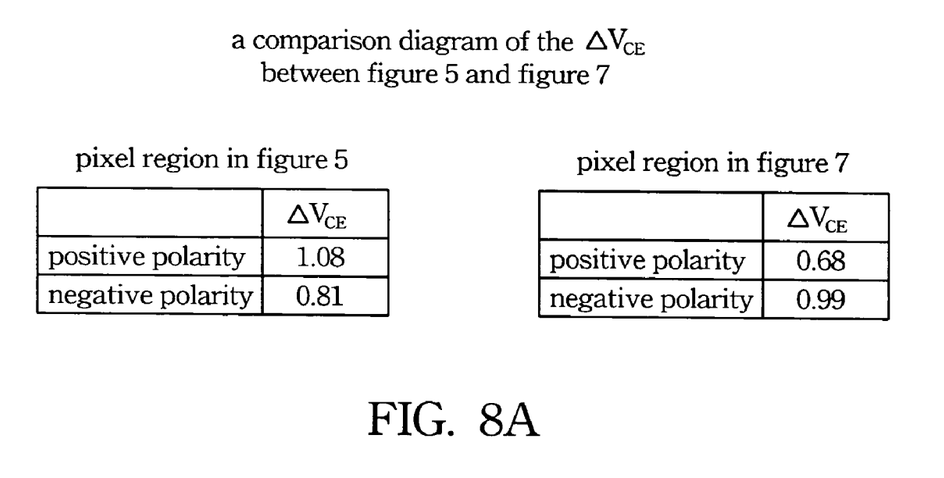
FIG. 8A illustrates a comparison diagram of the control electrode voltage variation ($\Delta V_{CE}$) in the pixel regions depicted in FIG. 5 and FIG. 7 when the scan signals do not select the pixel regions.

FIG. 8A illustrates a comparison diagram of the control electrode voltage variation ($\Delta V_{CE}$) in the pixel regions depicted in FIG. 5 and FIG. 7 when the scan signals do not select the pixel regions. According to this diagram, when an additional capacitor is not used to cross-connect the source electrode and the drain electrode of the thin film transistor $T_2'$ illustrated in FIG. 5, the voltage variation ($\Delta V_{CE}$) of the control electrode ($E_{CE}$) is 1.08 volts during the positive polarity period of the dot inversion driving method. The voltage variation ($\Delta V_{CE}$) of the control electrode ($E_{CE}$) is 0.81 volts during the negative polarity period of the dot inversion driving method. On the other hand, when an additional capacitor is used to cross-connect the source electrode and the drain electrode of the thin film transistor $T_2'$ illustrated in FIG. 7, the voltage variation ($\Delta V_{CE}$) of the control electrode ($E_{CE}$) is 0.68 volts during the positive polarity period of the dot inversion driving method. On the other hand, the voltage variation ($\Delta V_{CE}$) of the control electrode ($E_{CE}$) is 0.99 volts during the negative polarity period of the dot inversion driving method.

Figure 8B:
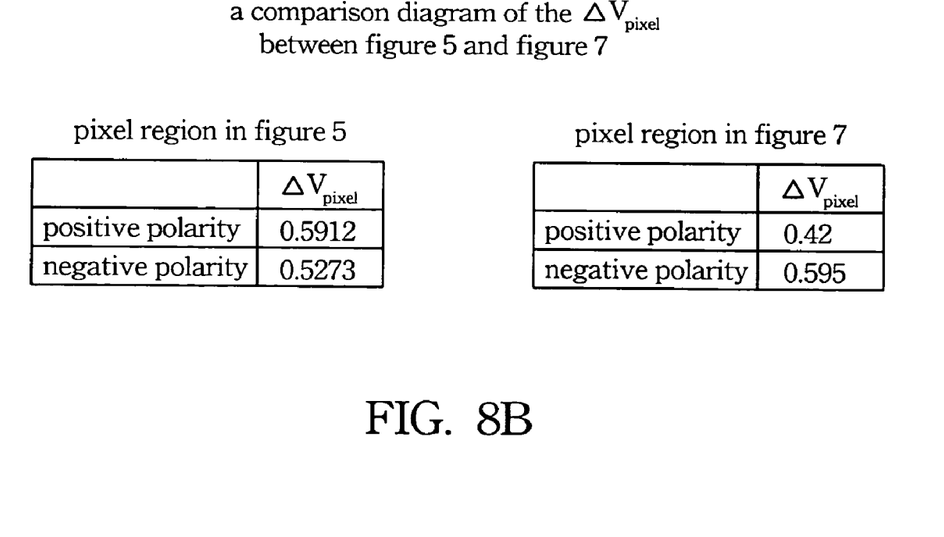
FIG. 8B illustrates a comparison diagram of the pixel electrode voltage variation ($\Delta V_{pixel}$) in the pixel regions depicted in FIG. 5 and FIG. 7 when the scan signals do not select the pixel regions.

On the other hand, FIG. 8B illustrates a comparison diagram of the pixel electrode voltage variation ($\Delta V_{pixel}$) in the pixel regions depicted in FIG. 5 and FIG. 7 when the scan signals do not select the pixel regions. When an additional capacitor is not used to cross-connect the source electrode and the drain electrode of the thin film transistor $T_2'$ illustrated in FIG. 5, the pixel voltage variation ($\Delta V_{pixel}$) resulting from the control electrode voltage variation ($\Delta V_{CE}$) is 0.5912 volts during the positive polarity period of the dot inversion driving method. The pixel voltage variation ($\Delta V_{pixel}$) resulting from the control electrode voltage variation ($\Delta V_{CE}$) is 0.5273 volts during the negative polarity period of the dot inversion driving method. On the other hand, when an additional capacitor is used to cross-connect the source electrode and the drain electrode of the thin film transistor $T_2'$ illustrated in FIG. 7, the pixel voltage variation ($\Delta V_{pixel}$) resulting from the control electrode voltage variation ($\Delta V_{CE}$) is 0.42 volts during the positive polarity period of the dot inversion driving method. On the other hand, the pixel voltage variation ($\Delta V_{pixel}$) resulting from the control electrode voltage variation ($\Delta V_{CE}$) is 0.595 volts during the negative polarity period of the dot inversion driving method.

According to the comparison diagrams illustrated in FIG. 8A and FIG. 8B, the leakage current in a pixel region is obviously improved by using an additional capacitor to cross-connect the source electrode and the drain electrode of the thin film transistor $T_2'$. Therefore, the voltage variations $\Delta E_{pixel}$ and $\Delta V_{pixel}$ is improved so as to reduce the flicker phenomenon As a whole, there are two thin film transistor groups in each pixel region according to the present invention. The two thin film transistor groups are controlled by different scan lines and receive the data signals from different data lines. At least one capacitor is used to couple the two thin film transistor groups. When operating, adjacent scan lines are kept in a "high" level in a specific scan time to turn on the two thin film transistor groups together. Different polarity signals are respectively transmitted to this pixel region through the two thin film transistor groups to form a voltage difference between the control electrode and pixel electrode. A multiple domain effect results. In other words, additional ridges or bumps are not required in the liquid crystal display to change the orientation of the liquid crystal molecules. Therefore, the manufacturing cost can be reduced. The range of the permitted error in the alignment process can be broadened to improve the manufacturing yield.

On the other hand, the number of the required thin film transistors in a pixel region can be reduced. Therefore, the aperture ratio of the pixel region can be raised and the RC delay phenomenon can be reduced.

As is understood by a person skilled in the art, the foregoing preferred embodiments of the present invention are illustrative of the present invention rather than limiting of the present invention. It is intended that this description cover various modifications and similar arrangements included within the spirit and scope of the appended claims, the scope of which should be accorded the broadest interpretation so as to encompass all such modifications and similar structure.

What is claimed is:

1. A liquid crystal display driving method, wherein said liquid crystal display comprises a plurality of pixel regions formed by a plurality of data lines crossing a plurality of scan lines and at least one common electrode, and, in each pixel region, a pixel electrode is connected to a data line through a first switching device and a control electrode is connected to another data line through a second switching device, said driving method comprising:
   (a) turning on said second switching device to write data to said control electrode, wherein the data are transmitted by the data line connected with said second switching device;
   (b) turning on said first switching device to write data to said pixel electrode, wherein the data are transmitted by the data line connected with said first switching device;
   (c) turning off said second switching device to float said control electrode; and
   (d) turning off said first switching device,
   wherein said first switching device and said second switching device are turned on together during a specific time period.

2. The liquid crystal display driving method of claim 1, wherein two signals respectively transmitted by any two adjacent data line are inversed.

3. The liquid crystal display driving method of claim 1, wherein a voltage of said control electrode is larger than a voltage of said pixel electrode and the voltage of said pixel electrode is larger than a voltage of said common electrode in a positive time frame period.

4. The liquid crystal display driving method of claim 1, wherein a voltage of said common electrode is larger than a voltage of said pixel electrode and the voltage of said pixel electrode is larger than a voltage of said control electrode in a negative time frame period.

5. The liquid crystal display driving method of claim 1, wherein a capacitor is formed between said control electrode and said pixel electrode.

6. The liquid crystal display driving method of claim 1, wherein said second switching device is a thin film transistor.

7. The liquid crystal display driving method of claim 1, wherein said second switching device is formed by two thin film transistors having a common connection and arranged in series.

8. The liquid crystal display driving method of claim 7, said second switching device further comprising a capacitor, wherein a first end of the capacitor is connected to said common connection.

9. The liquid crystal display driving method of claim 8, a second end of the capacitor is connected to said pixel electrode.

10. A liquid crystal display structure, comprising:
    at least one common electrode located over a first substrate;
    a plurality of scan lines arranged in parallel to each other and located over a second substrate; and
    a plurality of data lines arranged in parallel to each other and located over said second substrate, wherein said data lines crossing said scan lines and any adjacent scan lines and any adjacent data lines define a pixel region, said each pixel region comprising;
    adjacent first and second scan lines;
    adjacent first and second data lines;
    a first switching device respectively connecting to said first scan line and said first data line;
    a pixel electrode connecting to said first data line through said first switching device;
    a second switching device respectively connecting to said second scan line and said second data line, wherein said first switching device and said second switching device are turned on together in a specific time period; and
    a control electrode connecting to said second data line through said second switching device.

11. The liquid crystal display structure of claim 10, wherein a capacitor is formed between said control electrode and said pixel electrode.

12. The liquid crystal display structure of claim 10, wherein said second switching device is formed by two thin film transistors having a common connection and arranged in series.

13. The liquid crystal display structure of claim 12, said second switching device further comprises a capacitor, wherein a first end of the capacitor is connected to the common connection.

14. The liquid crystal display structure of claim 13, wherein a second end of the capacitor is connected to the pixel electrode.

15. The liquid crystal display structure of claim 10, wherein said structure further comprises a capacitor located between said common electrode and said pixel electrode.

16. The liquid crystal display structure of claim 10, wherein said structure further comprises a capacitor located between said common electrode and said control electrode.

17. The liquid crystal display structure of claim 10, wherein signals respectively transmitted by said first and second data lines are inversed.

* * * * *